United States Patent [19]
Buchanan

[11] Patent Number: 5,603,526
[45] Date of Patent: Feb. 18, 1997

[54] PRESSURE VENT FOR AIR BAG CUSHION

[75] Inventor: Eric S. Buchanan, North Ogden, Utah

[73] Assignee: Morton International, Inc., Chicago, Ill.

[21] Appl. No.: 586,079

[22] Filed: Jan. 16, 1996

[51] Int. Cl.$^6$ ................................................... B60R 21/30
[52] U.S. Cl. .......................... 280/739; 280/743.1
[58] Field of Search ................................. 280/738, 739, 280/740, 743.1

[56] References Cited

U.S. PATENT DOCUMENTS

| | | | |
|---|---|---|---|
| 3,451,693 | 6/1969 | Carey | 280/739 |
| 3,511,519 | 5/1970 | Martin | 280/739 |
| 3,527,475 | 9/1970 | Carey et al. | 280/739 |
| 3,831,972 | 8/1974 | Allgaier et al. | 280/150 |
| 3,892,425 | 7/1975 | Sakairi et al. | 280/150 |
| 3,937,488 | 2/1976 | Wilson et al. | 280/150 |
| 4,097,065 | 6/1978 | Okada et al. | 280/739 |
| 4,805,930 | 2/1989 | Takada | 280/739 |
| 5,007,662 | 4/1991 | Abramczyk et al. | 280/739 |
| 5,016,913 | 5/1991 | Nakajima et al. | 280/738 |
| 5,056,815 | 10/1991 | Geisreiter | 280/736 |
| 5,073,418 | 12/1991 | Thornton et al. | 428/34.9 |
| 5,131,434 | 7/1992 | Krummheuer et al. | 139/35 |
| 5,178,408 | 1/1993 | Barrenscheen et al. | 280/728 |
| 5,186,488 | 2/1993 | Takano | 280/728 |
| 5,219,179 | 6/1993 | Eyrainer et al. | 280/739 |
| 5,246,250 | 9/1993 | Wolanin et al. | 280/739 |
| 5,333,903 | 8/1994 | Eyrainer et al. | 280/743 |
| 5,370,925 | 12/1994 | Koscki | 428/225 |
| 5,405,166 | 4/1995 | Rogerson | 280/739 |
| 5,478,111 | 12/1995 | Marchant et al. | 280/739 |
| 5,492,363 | 2/1996 | Hartmeyer et al. | 280/739 |
| 5,501,488 | 3/1996 | Saderholm et al. | 280/739 |

FOREIGN PATENT DOCUMENTS

| | | |
|---|---|---|
| 0529371 | 3/1993 | European Pat. Off. . |
| 0536677 | 4/1993 | European Pat. Off. . |
| 9009908 | 9/1990 | WIPO . |

*Primary Examiner*—Kenneth R. Rice
*Attorney, Agent, or Firm*—Taylor J. Ross; Gerald K. White

[57] ABSTRACT

An air bag cushion having improved frangible vent coverings. The cushion includes one or more vent openings which will permit the inflation gas to exit the cushion and provide the proper pressure reduction for preventing injury to the passenger. Each of the vent openings includes a frangible covering associated therewith. The coverings include a main body have a peripheral shape and size to extend beyond the edge of the vent opening. the main body overlies and completely covers the vent opening. The periphery of the covering is frangibly secured to the cushion, such as by a tear seam. The covering also includes a tab extending outward from the main body, and also overlying the cushion. The tab is permanently secured to the cushion, such as by a permanent seam. The tear seam is designed to release when the pressure in the cushion, acting upon the portion of the covering overlying the vent, exceeds a predetermined pressure which is known to be associated with compression of the cushion by the passenger. When the tear seam fails, the vent is uncovered, and the desired venting occurs. The covering, however is retained to the cushion by the tab and permanent seam.

20 Claims, 1 Drawing Sheet

PRESSURE VENT FOR AIR BAG CUSHION

BACKGROUND OF THE INVENTION

Field of the Invention

The present invention relates in general to venting of air bag passive restraint cushions. In particular, the present invention relates to an improved frangible vent covering for such a cushion.

Description of the Related Art

Air bag passive restraint systems are increasingly common in contemporary vehicles. Such systems typically include an inflator for producing a quantity of inflation gas upon receipt of a signal indicating a collision. The inflator is connected to a cushion in the form of a flexible fabric bag. The inflation gas inflates the cushion to a predetermined pressure. During the collision the passenger is forced against the cushion, compressing the cushion.

During this compression the volume of the cushion is reduced. If the cushion were simply filled with the quantity of inflation gas, the pressure would rise in the cushion with the reduced volume until the pressure reached a point that the cushion was sufficiently hard that the cushion would injure the passenger. To prevent this, it has been known to provide vent holes in the cushion. The vent holes allow the inflation gas to exit the cushion in a controlled manner. This permits the pressure within the cushion to be relieved during the compression, providing a soft yet firm deceleration of the passenger, thus preventing injury.

While these vent holes are necessary for most inflator and cushion designs to operate properly during compression by the passenger, they produce undesirable consequences. Specifically, if the vents are fully open during the entire inflation process and during the time prior to compression by the passenger, the inflation gas will exit through the vent during these times. This means that a large quantity of inflation gas, sometimes up to 40%, is lost before the passenger compresses the cushion. This in turn requires that the inflator produce excess gas in order to have the required amount in the cushion at the start of compression. Building the inflator to produce excess gas of course increases the size, weight and cost of the inflator.

One solution which overcomes this problem is to provide a frangible covering over the vent, such that the vent is closed until the pressure rise during compression. When the pressure rises due to this compression, but before the pressure becomes dangerous, the frangible covering breaks and opens the vent. These arrangements thus permit only the actual necessary amount of inflation gas to be produced, yet still provide the required venting.

Examples of such arrangements are shown in U.S. Pat. No. 3,527,475 to Carey et al., U.S. Pat. No. 4,805,930 to Takada, and U.S. Pat. No. 5,219,179 to Eyerainer et al. While each of these arrangements is serviceable, certain drawbacks are still present. Specifically, Eyerainer et al. show the use of a perforation line in the cushion itself, forming a portion of a open polygon. Since the polygon is not closed, the entire section formed by the perforation will not be blown from the cushion, which is good. However, the open polygon necessarily results in two ends to the perforation line. There is always a worry that the perforation line will continue to tear from this line, opening a vent much larger than required and reducing the pressure to dangerous levels.

All three noted patents also show a standard vent opening covered by various patches. These closed polygon vent openings eliminate the worry of vent tears, but the patches provided are unduly complicated and expensive. Takada shows a patch having seams which tear the patch during distention of the patch caused by excess pressure. Eyerainer et al and Carey both show patches secured to the cushion about the vent, but which also include perforation lines. This is a simplification, but still includes drawbacks.

Carey shows an open polygon perforation line in the patch. Here there is again the worry that the tearing will not stop at the end of the perforations, permitting a section of the patch to be blown from the cushion, injuring the passenger. Eyerainer et al. also provide ends to the perforation lines, but do not form open polygons. As such, the possibility that the completed polygon will blow away is reduced. However, the X pattern of tear lines in Eyerainer does not full uncover the circular vent opening upon tearing, but instead forms an inscribed square. As such, the vent and opening must be designed together to provide the desired opening size in the patch, rather than in the vent. This makes modification of vent size more difficult.

SUMMARY OF THE INVENTION

An object of the present invention is to provide an air bag cushion which provides the necessary venting to fully protect the passenger.

Another object of the present invention is to provide such a cushion with a frangible vent covering which blocks venting until necessary, to thus avoid wasting inflation gas.

Yet another object of the present invention is to provide such a frangible vent covering which reliably fails at the proper time for the desired venting.

A further object of the present invention is to provide such a frangible vent covering which retains all parts of the covering on the cushion after failure to eliminate the possibility of injury to the passenger by a portion of the covering.

Yet another object of the present invention is to provide a frangible vent covering which is simple and inexpensive, and permits simple variation in cushion venting characteristics.

These and other objects are achieved by an air bag cushion having improved frangible vent coverings. The cushion includes one or more vent openings which will permit the inflation gas to exit the cushion and provide the proper pressure reduction for preventing injury to the passenger. Each of the vent openings includes a frangible covering associated therewith. The coverings include a main body having a peripheral shape and size to extend beyond the edge of the vent opening. The main body overlies and completely covers the vent opening. A peripheral edge of the covering is frangibly secured to the cushion, such as by a tear seam. The covering also includes a tab extending outward from the main body, and also overlying the cushion. The tab is permanently secured to the cushion, such as by a permanent seam. The tear seam is designed to release when the pressure in the cushion, acting upon the portion of the covering overlying the vent, exceeds a predetermined pressure which is known to be associated with compression of the cushion by the passenger. When the tear seam fails, the vent is uncovered, and the desired venting occurs. The covering, however is retained to the cushion by the tab and permanent seam.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
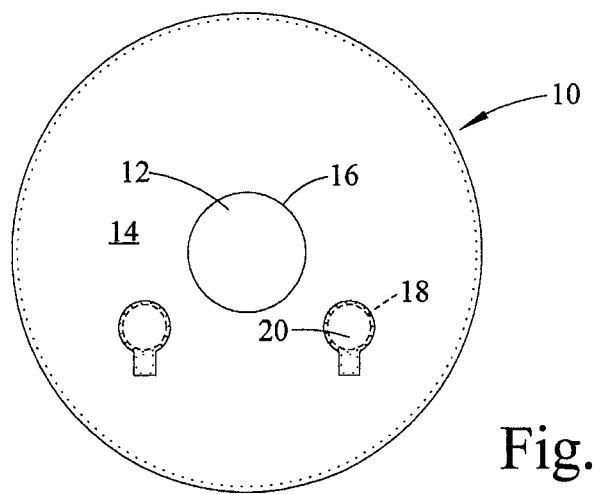
FIG. 1 is a rear view of an air bag cushion having a frangible vent covering according to the present invention.

With reference to FIG. 1, there is shown an air bag passive restraint cushion according to the present invention, generally designated by reference numeral 10. The cushion 10 is formed of one or more pieces of flexible fabric formed into an enclosure surrounding an interior. In the cushion shown, there are front and rear sheets 12 and 14, respectively, (with the front sheet intended to contact the passenger) each having a circular periphery, and which form the enclosure. The sheets are laid upon each other and their peripheries are secured together as by sewing. The particular size and shape of the cushion will vary depending upon its intended use (i.e., driver or passenger) and its placement (i.e., dashboard, roof, seat back, etc.). While a design typical of driver side cushions is shown, it is to be understood that the present invention is not limited to such cushions, but may be applied to any air bag cushion which requires the use of vents.

The cushion will have an inlet opening 16 to receive a quantity of inflation gas from an inflator (not shown). The cushion also includes one or more vent openings 18 in the form of through holes in the fabric enclosure. The size, shape, number and placement of vent holes will vary depending upon the performance characteristics of the inflator, anticipated collision forces, and other factors. It is preferable, however, that the vent openings 14 be located at positions which will direct the exiting gas away from the passenger. As such, the cushion of FIG. 1 includes the vent openings in the rear sheet 14.

Figure 2:
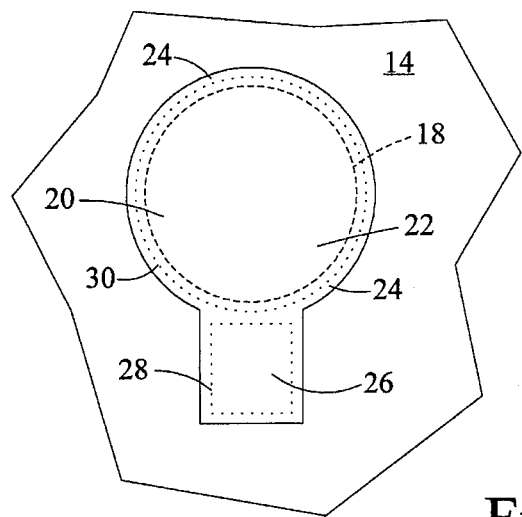
FIG. 2 is a detail plan view of the covering of FIG. 1.

Each of the vent openings is provided with a frangible covering 20. As is best shown in FIG. 2, the covering includes a main body 22 having a size and shape sufficient to extend beyond the periphery of the associated vent opening about the entire periphery of the vent opening. As such, with the main body positioned in covering relation to the vent opening, each main body will include a peripheral edge portion 24 which overlies the cushion, and in this embodiment the rear sheet 14.

The covering 20 also includes a tab 26 extending outward from the periphery of the main body. The tab preferably takes the general form of an elongated rectangle, with the long dimension extending peripherally outward of the main body. The tab is preferably formed as a monolithic portion of the main body. The tab and main body may advantageously be formed of a piece of flexible fabric, preferably of the type used to form the cushion.

The tab is secured permanently to the cushion, and in this embodiment to the rear sheet. This may be effected by adhesives, thermal bonding, or, preferably, sewing. As shown, the tab is secured by sewing 28. In contrast, the main body is frangibly secured to the cushion. In particular, the peripheral edge portion 24 is frangibly secured to the cushion surrounding the vent opening in such a manner that the edge portion will remain secured to the cushion so long as the pressure within the cushion remains below a predetermined threshold pressure, but will be released from the cushion when the pressure within the cushion reaches the threshold pressure.

This may be achieved using various materials. For example, adhesives, thermal bonding or sewing could be used. In each case the attachment will be designed to fail when the cushion internal pressure reaches the threshold pressure. In the embodiment shown, the attachment is effected by the use of a tear seam 30.

The threshold pressure is determined to be a pressure which is not attained simply by activation of the associated inflator. Rather, the threshold pressure is set to be a safe pressure attained when the inflated cushion is compressed by the passenger during a collision. By "safe", it is meant that the pressure is still sufficiently low that the cushion is not so rigid as to cause injury to the passenger.

Figure 3:
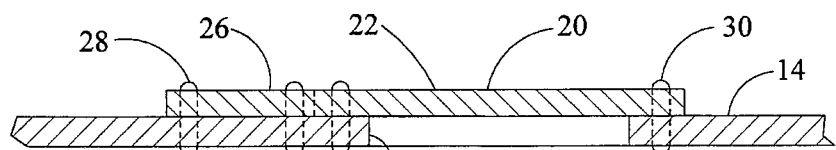
FIGS. 3 and 4 are a cross-sectional side views of the vent covering prior to failure, and after failure, respectively.
Figure 4:
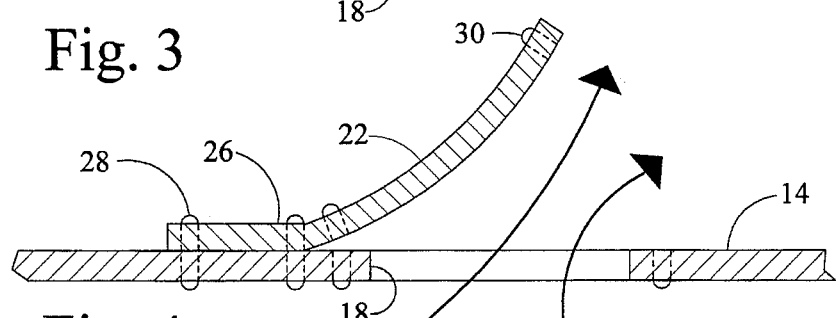

As noted, until this threshold pressure is attained, the covering 20 will remain in overlying relation to the vent opening, as shown in FIGS. 1–3. As such, until the threshold pressure is reached the covering restricts gas flow from the vent opening, and the cushion is essentially a closed volume into which the inflation gas is flowing, causing inflation of the cushion. When the threshold pressure is reached, the attachment of the main body fails, and the covering takes the position shown in FIG. 4. As may be seen, the tab 26 retains the covering with the cushion, so that there is no possibility of a loose covering impacting and injuring the passenger. In this position the vent opening 18 is not restricted in any way, and the inflation gas may freely exit the cushion via the vent opening.

The above arrangement clearly permits the entire quantity of inflation gas to be used to inflate the cushion, as essentially none of the gas is lost before the passenger begins compressing the cushion. It is also simple, as the vent is simply formed in the usual manner, and the covering is formed of a piece of fabric without the need for perforation lines, etc, and the sewing steps are very typical. Safety is also achieved with this invention, since the vent is a closed polygon (here shown as a circle) to eliminate the possibility of tearing beyond a perforation line as in the Eyerainer et al. patent noted above, nor does the covering include any perforation lines which need to be formed or which could tear beyond their limits. Finally, modification of vent characteristics is very simple with this arrangement. First, the vent is altered to the desired size. Thereafter, at most, the covering is cut to a new size to fit the vent. Alternatively, the covering could be formed to a size to cover the maximum desired vent size, and this same covering could be reliably used with any vents having a size smaller than that maximum.

While this arrangement is useful in standard air bag systems, it is especially useful in an adaptive air bag system. An adaptive air bag system is one which alters the air bag characteristics based upon variable factors such as the severity of the collision, the position of the passenger (i.e., initially close to, or far away from, the inflating cushion), ambient temperature, etc. In these adaptive systems one popular method of altering the system performance is to provide an inflator which produces variable amounts of inflation gas. For example, in a moderate collision, the inflator would produce a reduced output of gas, perhaps about 70% of its possible output. However, for a severe collision, the inflator would produce a full output of gas, or 100% of its possible output.

Even thought the inflator produces variable amounts of gas, the volume of the cushion remains the same. The inflator will of course be designed such that its full output will achieve the desired results in this cushion volume. The reduced output will of course inflate this same cushion volume to a lesser pressure. However, this reduced inflation pressure must still be sufficient to protect the passenger in the moderate collision. As such, losing any of the reduced output gas via the vent openings before compression can reduce the inflation pressure to a dangerous extent. By use of the present covering, however, this possibility is eliminated, and the entirety of the reduced output is available for protecting the passenger.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. In an air bag cushion having a flexible fabric enclosure and at least one vent opening extending through said enclosure to expel gas inflating said cushion, the improvement comprising:

a frangible covering selectively restricting flow of said gas from said cushion, said covering including a main body covering said vent opening and having a peripheral edge portion overlying said enclosure, said edge portion being frangibly secured to said confine to secure said main body to said confine while said cushion is inflated to a predetermined pressure to thus restrict flow of said gas through said vent opening, and to fail above said predetermined pressure to permit gas to be expelled from said vent opening, said covering further including a tab extending from said main body, said tab being permanently secured to said enclosure to retain said covering to said cushion after failure.

2. A cushion as in claim 1, wherein said edge portion is frangibly secured to said enclosure by a tear seam.

3. A cushion as in claim 2, wherein said tab is secured to said enclosure by stitching.

4. A cushion as in claim 1, wherein said main body and said tab are a monolithic unit.

5. A cushion as in claim 4, wherein said edge portion is frangibly secured to said enclosure by a tear seam.

6. A cushion as in claim 5, wherein said tab is secured to said enclosure by stitching.

7. A cushion as in claim 6, wherein said predetermined pressure is not reached upon inflation of said cushion, but is reached upon inflation of said cushion and compression of said cushion by a passenger during a collision.

8. A cushion as in claim 4, wherein said covering and said cushion are formed of the same flexible fabric.

9. A cushion as in claim 8, wherein said edge portion is frangibly secured to said enclosure by a tear seam.

10. A cushion as in claim 9, wherein said tab is secured to said enclosure by stitching.

11. An adaptive air bag passive restraint system, comprising:

an inflator constructed and arranged to selectively produce a partial amount of gas or a full amount of gas depending upon the sensed factors during a collision;

a cushion operatively associated with said inflator to receive said gas, said cushion having a flexible fabric enclosure and at least one vent opening extending through said enclosure to expel said gas inflating said cushion, said cushion, when said full amount of gas is received therein, being inflated to a first pressure; and a frangible covering selectively restricting flow of said gas from said cushion, said covering including a main body covering said vent opening and having a peripheral edge portion overlying said enclosure, said edge portion being frangibly secured to said confine to secure said main body to said confine while said cushion is inflated to said first pressure to thus restrict flow of said gas through said vent opening, and to fail above said first pressure to permit gas to be expelled from said vent opening, said covering further including a tab extending from said main body, said tab being permanently secured to said enclosure to retain said covering to said cushion after failure.

12. A cushion as in claim 11, wherein said edge portion is frangibly secured to said enclosure by a tear seam.

13. A cushion as in claim 12, wherein said tab is secured to said enclosure by stitching.

14. A cushion as in claim 11, wherein said main body and said tab are a monolithic unit.

15. A cushion as in claim 14, wherein said edge portion is frangibly secured to said enclosure by a tear seam.

16. A cushion as in claim 15, wherein said tab is secured to said enclosure by stitching.

17. A cushion as in claim 16, wherein said predetermined pressure is not reached upon inflation of said cushion, but is reached upon inflation of said cushion and compression of said cushion by a passenger during a collision.

18. A cushion as in claim 14, wherein said covering and said cushion are formed of the same flexible fabric.

19. A cushion as in claim 18, wherein said edge portion is frangibly secured to said enclosure by a tear seam.

20. A cushion as in claim 19, wherein said tab is secured to said enclosure by stitching.

* * * * *